United States Patent [19]

Rancourt

[11] Patent Number: 5,410,123

[45] Date of Patent: Apr. 25, 1995

[54] PROCESS AND APPARATUS FOR WELDING ANNULAR BELLOWS

[76] Inventor: Yvon Rancourt, 3901 Chemin Mt. Sauvage, Apt. 103, St. Adéle, Quebec, Canada, J0R 1L0

[21] Appl. No.: 964,699

[22] Filed: Oct. 22, 1992

[51] Int. Cl.⁶ .................................. B23K 26/00
[52] U.S. Cl. ..................... 219/121.63; 219/121.13; 219/121.14; 219/121.64
[58] Field of Search ............ 219/121.13, 121.14, 219/121.63, 121.64; 228/8; 72/35

[56] References Cited

U.S. PATENT DOCUMENTS

| | | | |
|---|---|---|---|
| 3,918,622 | 11/1975 | Larsen | 228/8 |
| 4,102,438 | 7/1978 | Rancourt . | |
| 4,513,194 | 4/1985 | Mastromatteo | 219/121.13 |
| 4,644,129 | 2/1987 | Miller | 219/121.63 |
| 4,760,236 | 7/1988 | Stoll | 219/121.63 |
| 5,055,653 | 10/1991 | Funami et al. . | |
| 5,154,108 | 10/1992 | McClelland et al. | 92/35 |

FOREIGN PATENT DOCUMENTS

| | | |
|---|---|---|
| 136780 | 4/1985 | European Pat. Off. . |
| 233091 | 8/1987 | European Pat. Off. . |
| 2212852 | 7/1974 | France . |
| 1565144 | 2/1970 | Germany . |
| 3705500 | 9/1988 | Germany . |
| 3829728 | 3/1989 | Germany . |
| 60-120306 | 6/1985 | Japan . |
| 2-020681 | 1/1990 | Japan . |
| 2183522 | 6/1987 | United Kingdom . |

*Primary Examiner*—C. L. Albritton

[57] ABSTRACT

Method and apparatus for welding a plurality of parallel continuous seams on workpieces which comprise the steps of defining a welding station including a laser beam or electron beam welding source and a focal plane spaced from the welding source and wherein the focal plane is perpendicular and intersects a plane containing the radiation welding source. The welding source spans a welding zone defined at the intersection of the focal plane and the plane contains the welding source. The seams are maintained to be welded spaced apart and parallel and moving at least one of the welding stations and the several workpieces, in unison, relative to one another such that the seams to be welded pass through the welding zone whereby welded seams are formed continuously on the workpieces.

39 Claims, 10 Drawing Sheets

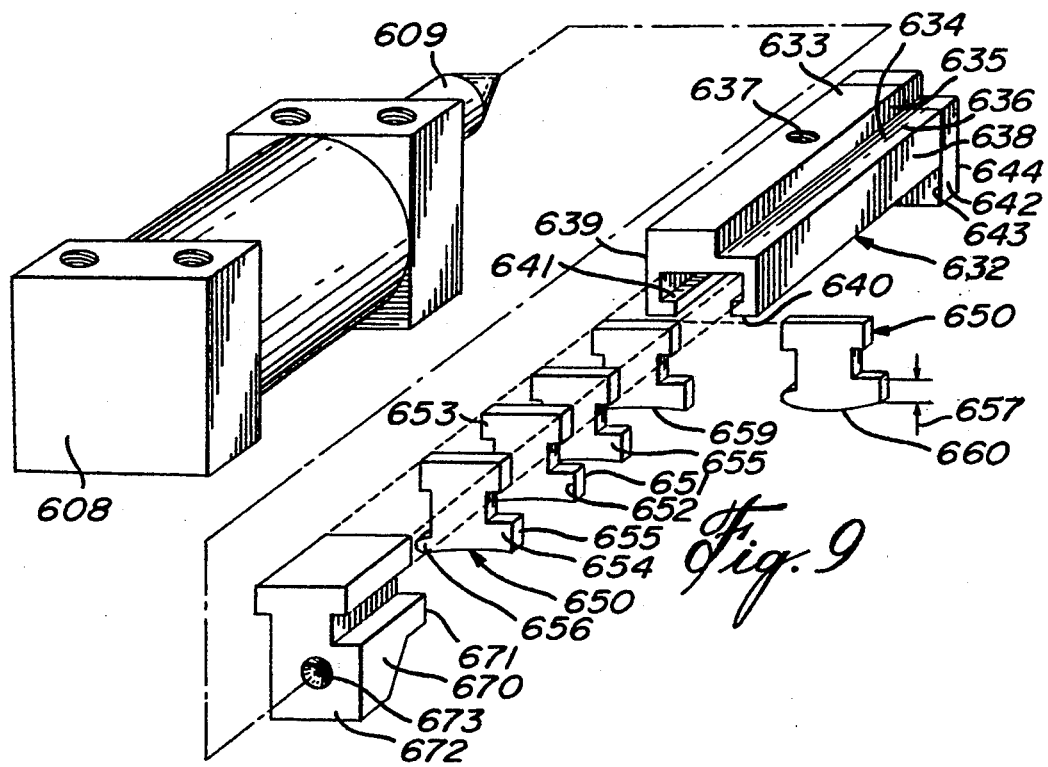
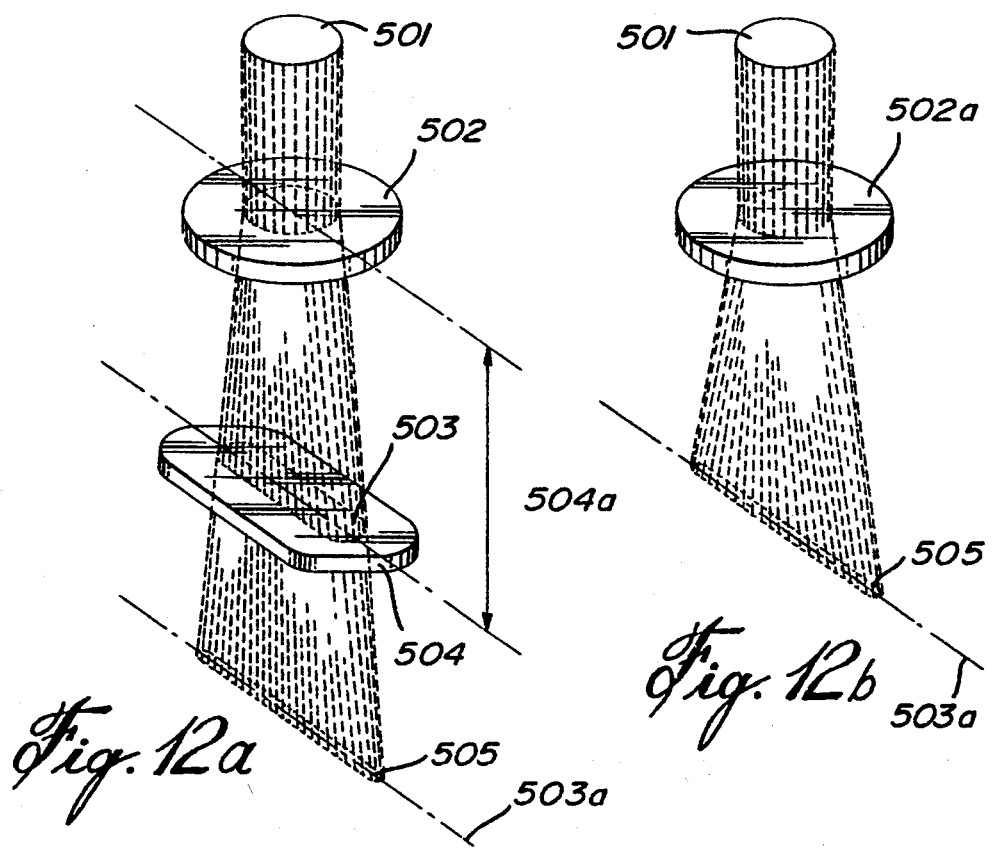

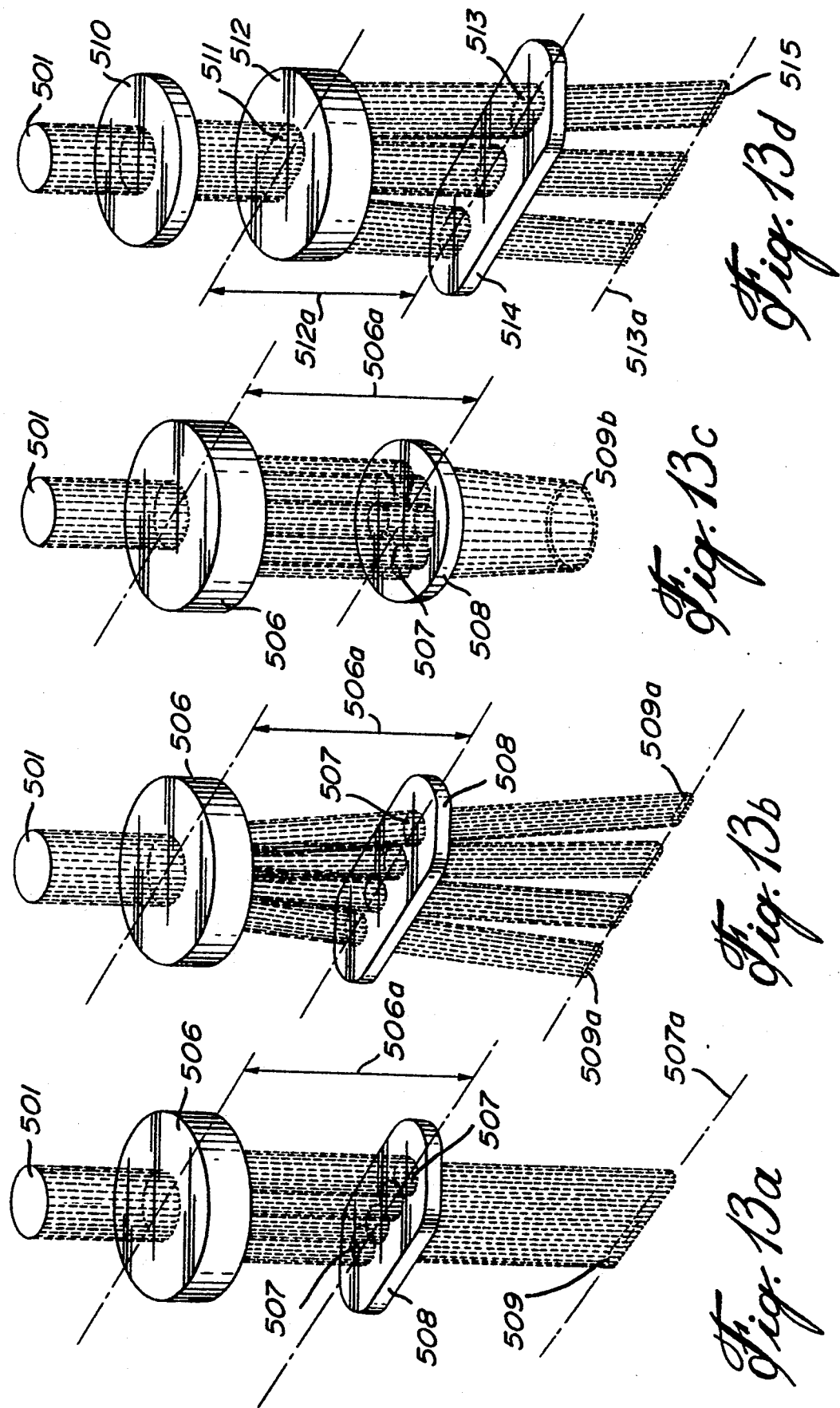

PROCESS AND APPARATUS FOR WELDING ANNULAR BELLOWS

BACKGROUND OF THE INVENTION

1. Field of the Invention

The present invention relates to welding, heat treating and surface machining techniques, particularly to improvements in welding simultaneously and at high speed a plurality of annular plates for a large diameter bellows in addition to improvements in laser beam delivery systems.

2. Description of the Prior Art

It is well known that the welding of bellows or expandable bladders (shown in U.S. Pat. No. 4,102,438) by electron beam or laser welding techniques has a high cost and is a time consuming process implicating the repetitive welding of the inside-diameter edges and outside-diameter edges of each annular sheet forming the bellows.

It is also recognized that a major problem is the welding of relatively large diameter bellows (over 12 inches in diameter), particularly produced from relatively thin material ($\pm 0.005''$). The deformation produced by the thermal expansion from the repetitive welding generates stress at the welding seam which makes it very difficult, if not impossible, to produce fluid-tight bellows on a large scale, without suffering a high rate of rejects.

It is also well known that the tracking of a seam to be welded, using a focused circular beam centered on the seam, by electron scanning or other methods, reduces the linear welding speed in view of the reaction time delay involved, and that such tracking is limited to one seam at a time.

It is also well known that it is relatively easy to scan and control the focus of an electron beam from an electron beam welder at high speed (measured in KHZ) since the beam is deflected and focused electromagnetically when used principally for heat treating or surface machining. However, with laser equipment, the scanning and focusing of a laser beam is done mechanically through mirrors or lens, thus limiting the speed and precision thereof. Great strides were made in improving surface heat treating or machining with the use of electron beam high speed scanning. However, the high cost, complexity and the negative environmental impact of electron beam equipment have limited the use of this technique.

Another factor which has a serious cost impact in laser surface machining is the limited area covered by the laser focal beam at the working surface, thus requiring a large amount of beam scanning or work piece movements, to cover a working area larger than the focal beam diameter.

SUMMARY OF THE INVENTION

It is an aim of the present invention to provide an electron beam welding technique to weld simultaneously a plurality of seams.

It is a further aim of the present invention to provide a laser welding technique to weld simultaneously a plurality of seams.

It is a further aim of the present invention to provide a holding and a separating means to provide the welding of a plurality of seams simultaneously.

It is a further aim of the present invention to provide a holding means to provide the welding of a plurality of seams formed from annular sheets for a bellows, simultaneously.

It is a further aim of the present invention to provide an improved laser beam delivery system means to provide, in the focal plane, an oblong laser beam pattern in order to produce an improved tracking speed for a welded seam, to allow the simultaneous welding of a plurality of seams, to improve laser surface machining or heat treating technique, that is, to assume the features of an electron beam welder without the high cost and negative environmental impact involved in electron beam welding, heat treating or surface machining techniques.

It is a further aim of the present invention to provide an improved laser beam delivery system to provide, in the focal plane, different geometrical shapes, such as an annular or "S" shape in order to produce an effect similar to a spot weld or to weld relatively small pieces instantaneously without having to make linear movements, thus reducing the negative impacts created by thermal distortion and the cost involved.

It is a further aim of the present invention to provide an improved laser beam delivery system to provide, in the focal plane, a plurality of oblong beam patterns in order to weld simultaneously a plurality of spaced-apart seams and to heat treat or surface machine a plurality of areas simultaneously from a workpiece or different workpieces.

A method of welding a plurality of parallel continuous seams on workpieces in accordance with the present invention comprises the steps of defining a welding station including a radiation welding source and a focal plane spaced from the radiation welding source and wherein the focal plane is perpendicular and intersects a plane containing the radiation welding source, the radiation welding source spanning a welding zone defined at the intersection of the focal plane and the plane containing the welding source, maintaining the seams to be welded spaced apart and parallel and moving at least one of the welding stations and the several workpieces, in unison, relative to one another such that the seams to be welded pass through the welding zone whereby welded seams are formed continuously on the workpieces.

More specifically, in one embodiment the radiation welding source is an electron beam generator adapted to scan the welding zone.

In a still more specific embodiment, the method includes a laser generator as the radiation welding source which delivers a laser beam which forms a focal pattern, by means of lenses or mirrors, which at least spans the welding zone.

The term "lens", when utilized in this specification, will also include mirrors.

An apparatus for welding a plurality of parallel continuous seams to join several workpieces in pairs includes jig means for maintaining the workpieces and for holding the workpieces and the seams to be welded in spaced-apart and parallel relationship, welding means including a radiation welding source and a focal plane spaced apart from the radiation welding source, means mounting the welding source in a plane intersecting and perpendicular to the focal plane, means associated with the welding station such that the welding source can span a welding zone at the intersection of the welding plane and the plane containing the welding source, means for moving one of the welding station and the jig such that the seams to be welded pass continuously through the welding zone whereby welded seams are formed continuously on the workpieces.

BRIEF DESCRIPTION OF THE DRAWINGS

Having thus generally described the nature of the invention, reference will now be made to the accompanying drawings, showing by way of illustration, preferred embodiments thereof, and in which:

FIG. 9 is an enlarged exploded fragmentary perspective view of a detail of the welding jig;

FIG. 12a is a schematic view of a laser beam delivery system to produce an oblong beam pattern;

FIG. 12b is another schematic view of a laser beam delivery system to produce an oblong beam pattern; and FIGS. 13a, 13b, 13c, and 13d are schematic views of laser beam delivery systems to produce an oblong beam pattern or a plurality of beam patterns using a beam divider.

DESCRIPTION OF THE PREFERRED EMBODIMENTS

Figure 1:
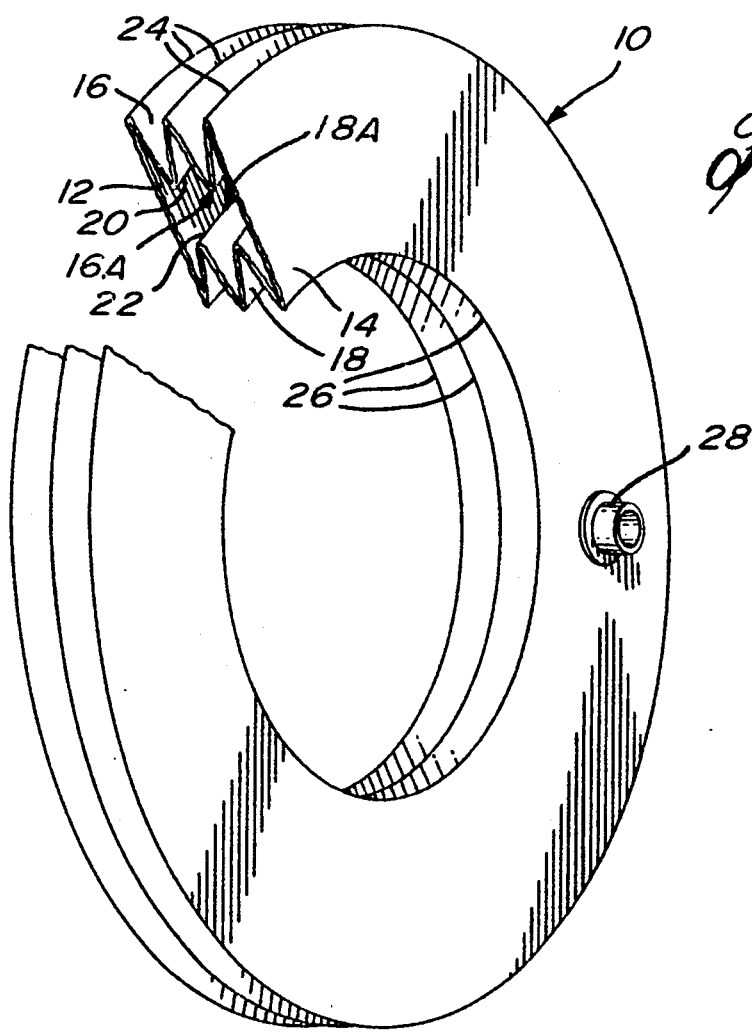
FIG. 1 is a perspective view, partly in cross-section, showing a typical annular expanded bladder or bellows.

Referring to FIG. 12a herein, laser beam 501 is transformed by means of a first mirror or lens 502 to an oblong beam 503. Oblong beam 503 is then focused transversally to longitudinal axis 503a by means of a second mirror or lens 504 to produce a generally oblong shaped beam 505 in the focal plane. This oblong focal beam 505 is particularly useful to simultaneously fusion weld a plurality of seams, or to track and fusion-weld a seam at high speed.

Beam 501 may be transformed in one step to an oblong focal beam 505 by means of a mirror or lens 502a, as shown in FIG. 12b. The advantage of using a plurality of lens or mirrors or a combination of both, as shown in FIG. 12a, is that the longitudinal dimension of axis 503a of oblong focal beam 505 may be calibrated to different sizes by varying the distance 504a between the lens or mirrors with an adjusting means.

In a second alternative embodiment in a laser beam delivery system, referring to FIG. 13a, beam 501 is divided by means of a beam divider 506 to a plurality of circular divided beams 507, generally overlapped, which are then focused transversally to longitudinal axis 507a by means of a focal mirror or lens 508 to produce at least a generally oblong focal beam 509. The plurality of circular divided beams 507 may be parallel, convergent or divergent. The longitudinal dimension of axis 507a of focal beam 509 may be calibrated to different sizes, when using a convergent or divergent beam divider, by varying the distance 506a between the beam divider 506 and the focal mirror or lens 508 with an adjusting means. When using a parallel beam divider, the distance 506a between beam divider 506 and focal mirror or lens 508 may be changed without affecting the focal beam 509. This is particularly useful when a telescopic beam delivery system is used. Referring to FIG. 13b, a plurality of focal oblong beams 509a may be produced by spacing apart the circular divided beams 507 and then by focusing them to simultaneously perform a plurality of functions. As can be seen, the beams are divergent.

Referring to FIG. 13c, it has also been contemplated to arrange the circular divided beams 507 such that shapes other than oblong may be produced in the focal plane, such as an "S" shape, oval or a ring. A ring pattern 509b is particularly useful for producing the equivalent of a spot weld without having the negative impacts of the undercut produced by electrodes. Also, instantaneous welding or brazing of relatively small circular pieces can be accomplished without having to do circular movements, thus eliminating thermal distortion, particularly critical in relatively thin material, and reducing the cost involved in machinery.

In a third embodiment of a laser beam delivery system, referring to FIG. 13d, beam 501 is transformed by means of a lens or mirror 510 to a primary oblong beam 511 which is then divided by means of a beam divider 512 to a plurality of secondary oblong beams 513, generally lined up, which are then focused transversally to longitudinal axis 513a by means of lens or mirror 514 to produce at least a wide, generally oblong, focal beam 515 or a plurality of generally oblong focal beams 515. The plurality of secondary oblong beams 513 may be parallel, convergent or divergent. The longitudinal dimension of axis 513a of focal beam 515 may be calibrated to different sizes, when using convergent or divergent beam dividers, by varying the distance 512a between the beam divider 512 and the focal mirror or lens 514. When using a parallel beam divider, the distance 512a, between the beam divider 512 and the focal mirror or lens 514, may be changed without affecting focal beam 515.

Reference will now be made to embodiments in a technique to weld simultaneously a plurality of seams particularly applied to the welding of annular bellows which are more complex to produce than linear seam welds. Such a bellows may be utilized as a bladder in U.S. Pat. No. 4,102,438.

Referring to FIG. 1, an annular bellows 10 includes annular end plates 12 and 14, annular outer concentric stage 16, and annular internal concentric stage 18. Each stage 16 and 18 is made up of an accordion arrangement of annular sheets or plates 19. Alternate inner and outer diameter welded seams in each stage and with the end plates 12 and 14 complete the bellows. A fluid inlet 28 is used when the annular bellows 10 performs as an expandable bladder.

The outside diameters of the external stage 16 and end plates 12 and 14 are welded at seams 24. The inside diameters of internal stage 18 and end plates 12 and 14 are welded at seams 26. The inside diameters of the external stage 16 are welded at seams 20. The outside diameters of the internal stage 18 are welded at seams 22.

Figure 2:
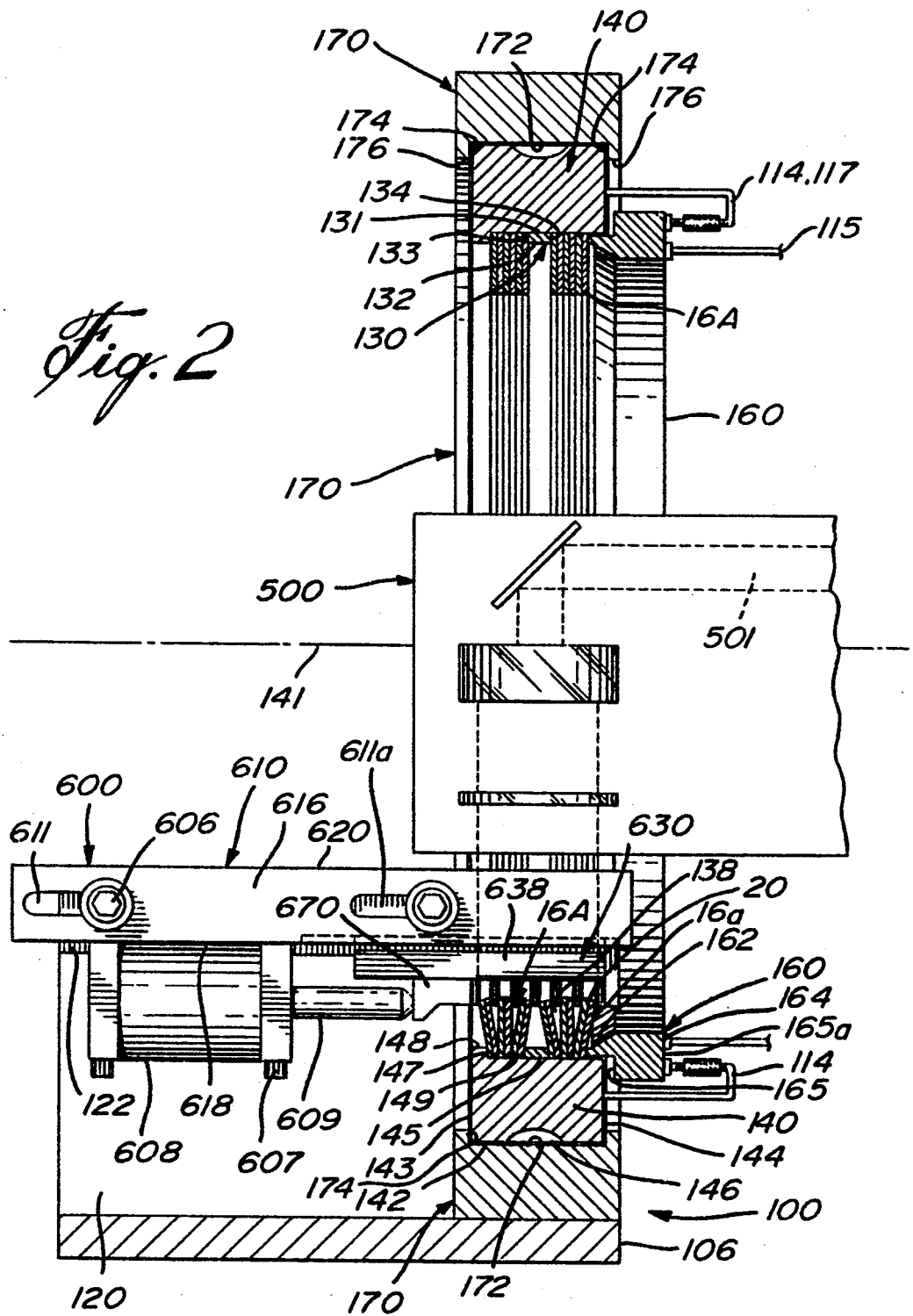
FIG. 2 is a fragmentary axial cross-section taken through a laser sub-assembly welding jig for welding the inside diameter of the outer concentric stage of annular plates.
Figure 6:
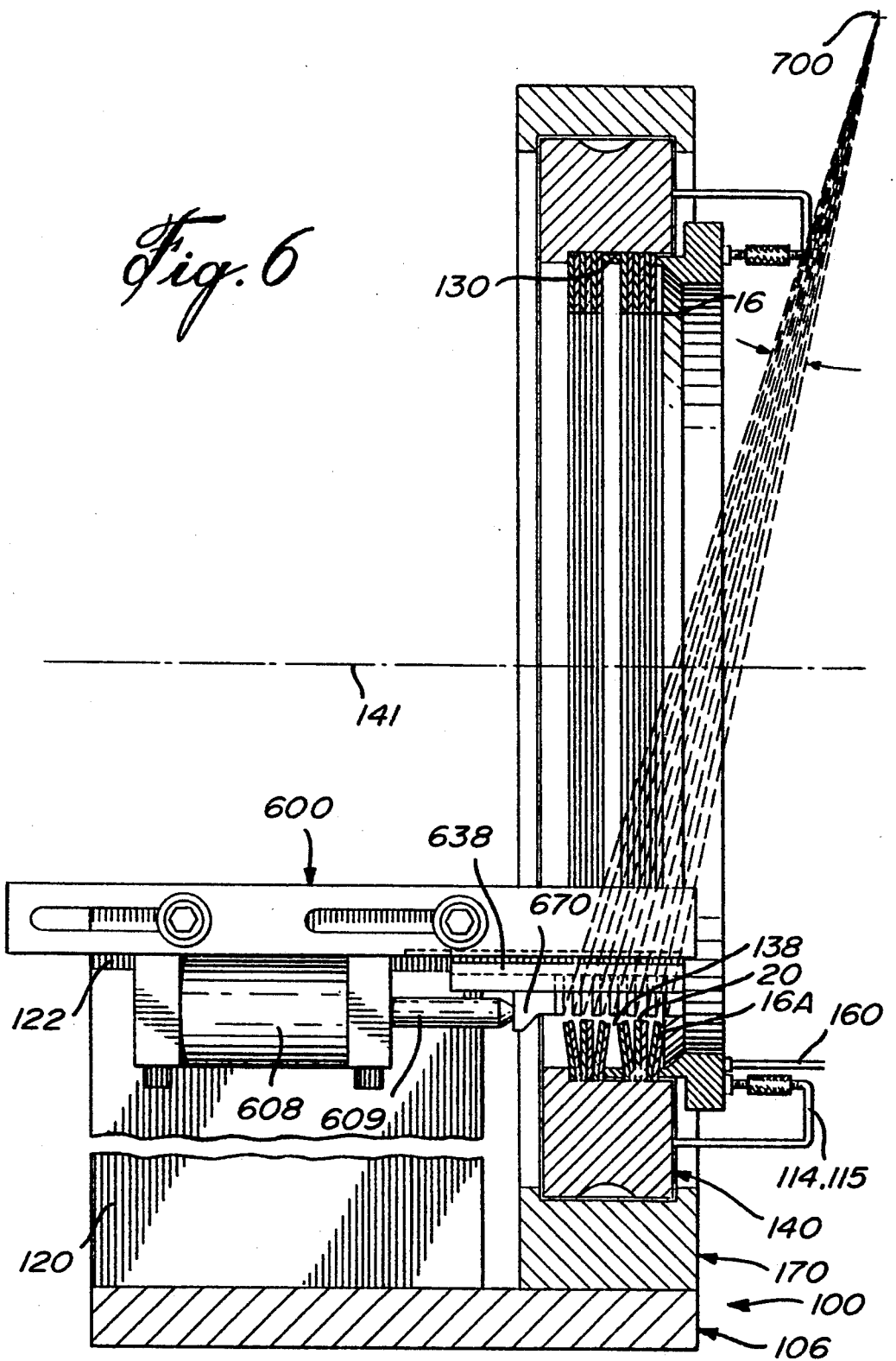
FIG. 6 is a fragmentary axial cross-section taken through the electron beam welding jig for welding the inside diameter of the outer concentric stage of the annular plates.

In the present embodiments, bellows 10 or a plurality of bellows 10 are welded in four phases as follows:

PHASE I: Referring to FIGS. 1, 2 and 6, the external stage 16 is welded by pairs at their inside diameters 20 to form sub-assembly 16A at a sub-assembly welding station 100 as will be described later. FIG. 2 refers to a laser welding technique, and FIG. 6 refers to an electron beam welding technique.

Figure 3:
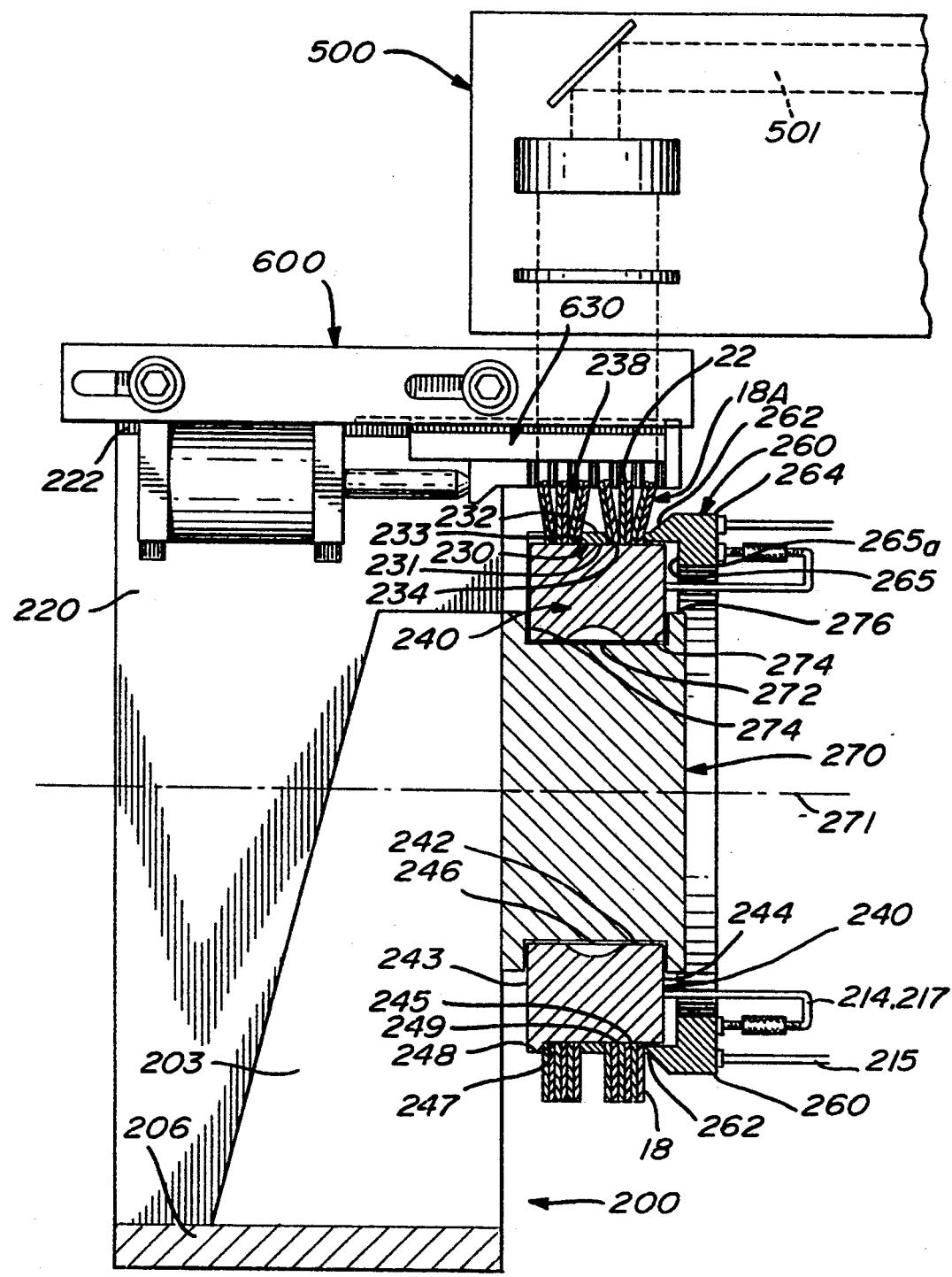
FIG. 3 is a fragmentary axial cross-section taken through a laser sub-assembly welding jig for welding the outside diameter of the inner concentric stage of annular plates.
Figure 7:
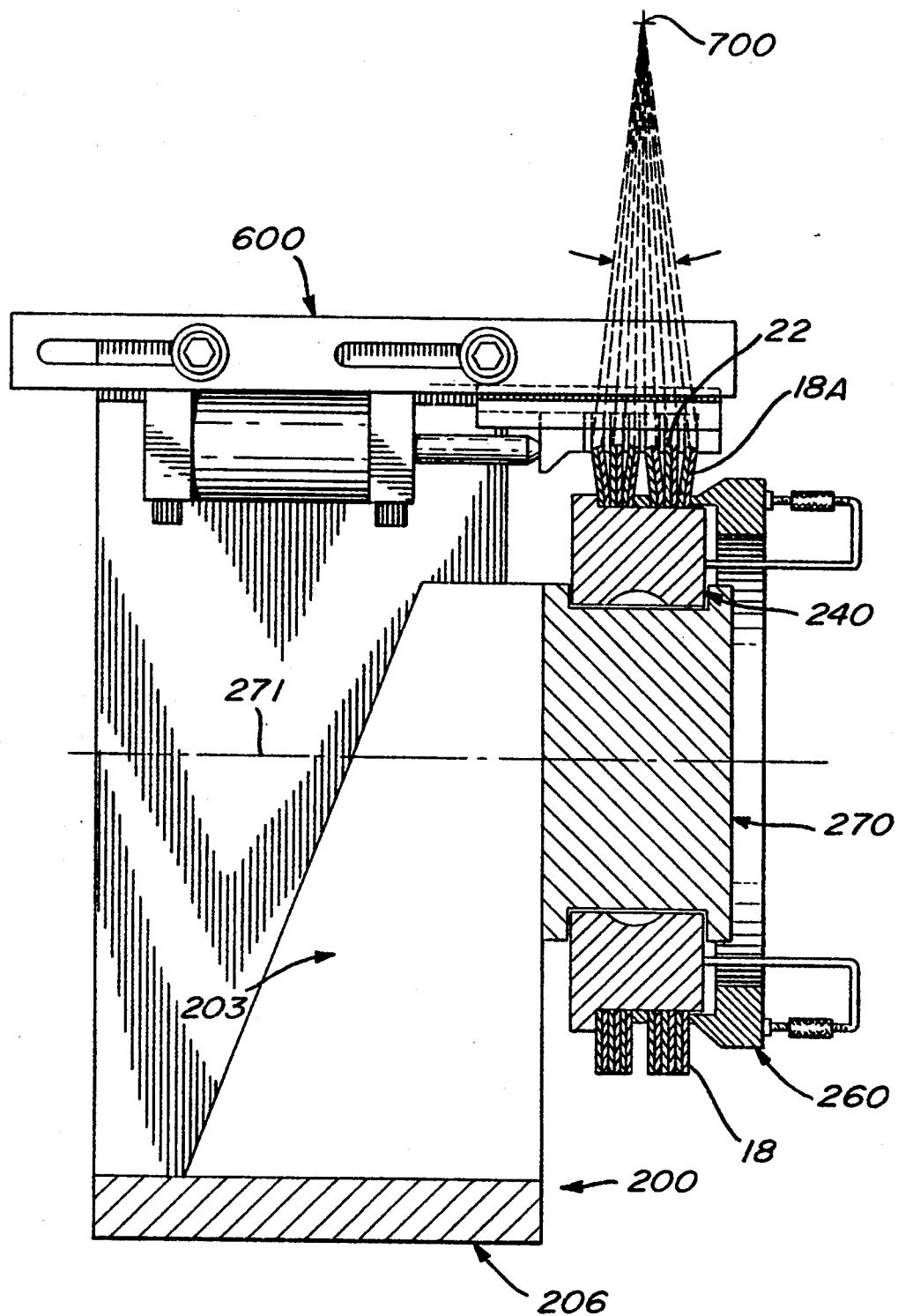
FIG. 7 is a fragmentary axial cross-section taken through an electron beam sub-assembly welding jig for welding the outside diameter of an inner stage of annular plates.

PHASE II: Referring to FIGS. 1, 3 and 7, the internal stages 18 are welded by pairs at their outside diameter 22 to form sub-assembly 18A, at a sub-assembly welding station 200 as will be described later. FIG. 3 refers to a laser welding technique, and FIG. 7 refers to an electron beam welding technique.

Figure 4:
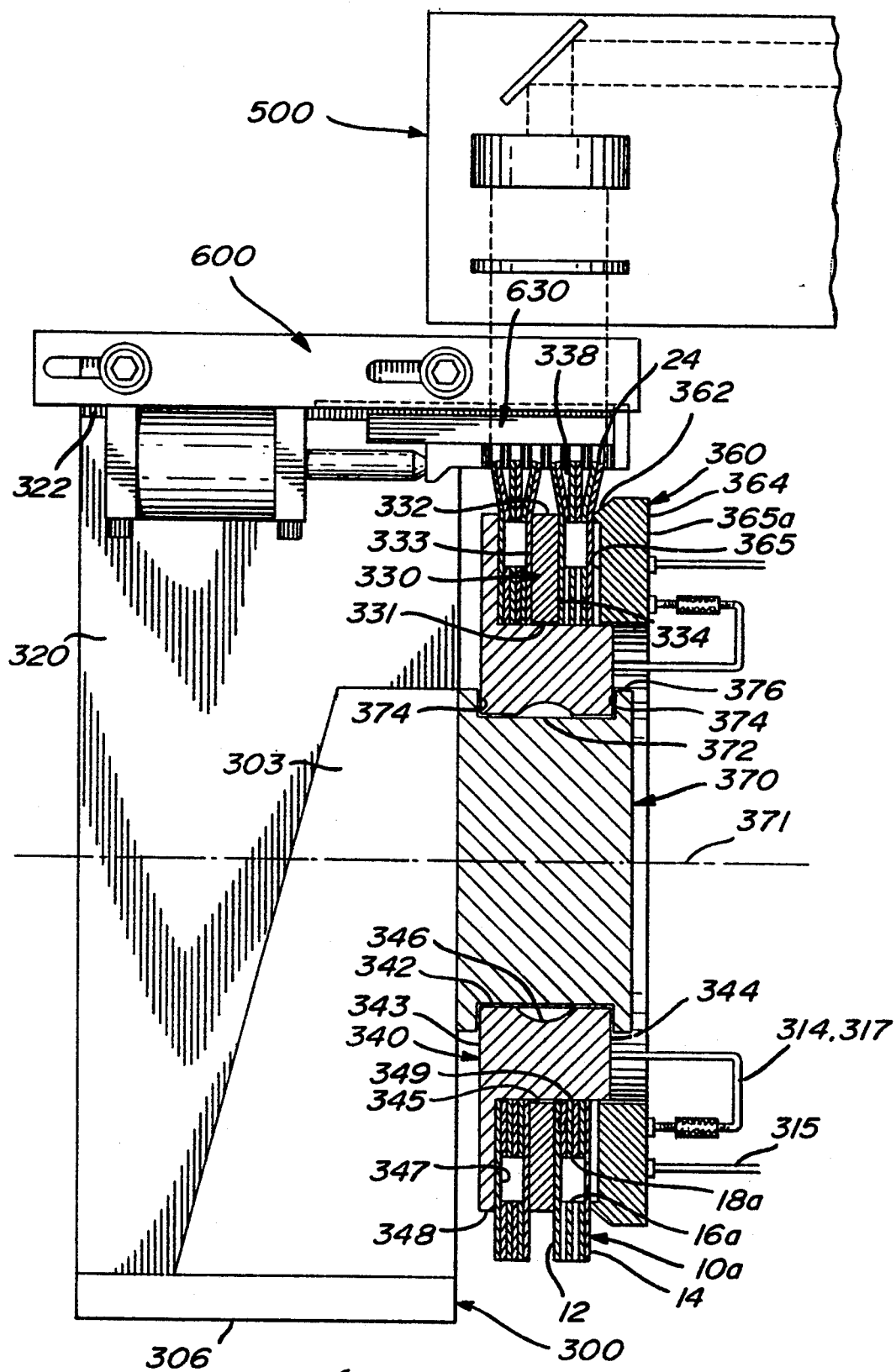
FIG. 4 is a fragmentary axial cross-section taken through a laser assembly welding jig for welding the outside diameter of the outer concentric stage of annular plates and end plates forming the bellows.

PHASE III: Referring to FIG. 1 and FIG. 4, end plate 12, external stage sub-assembly 16A from phase 1, internal stage sub-assembly 18A from phase 2, and end plate 14 are assembled at an assembly welding station 300 and outside diameters of end plate 12, external stage 16 and end plate 14 are welded to their respective adjacent counterparts at seams 24 to form a pre-welded bellows 10a as will be described later.

Figure 5:
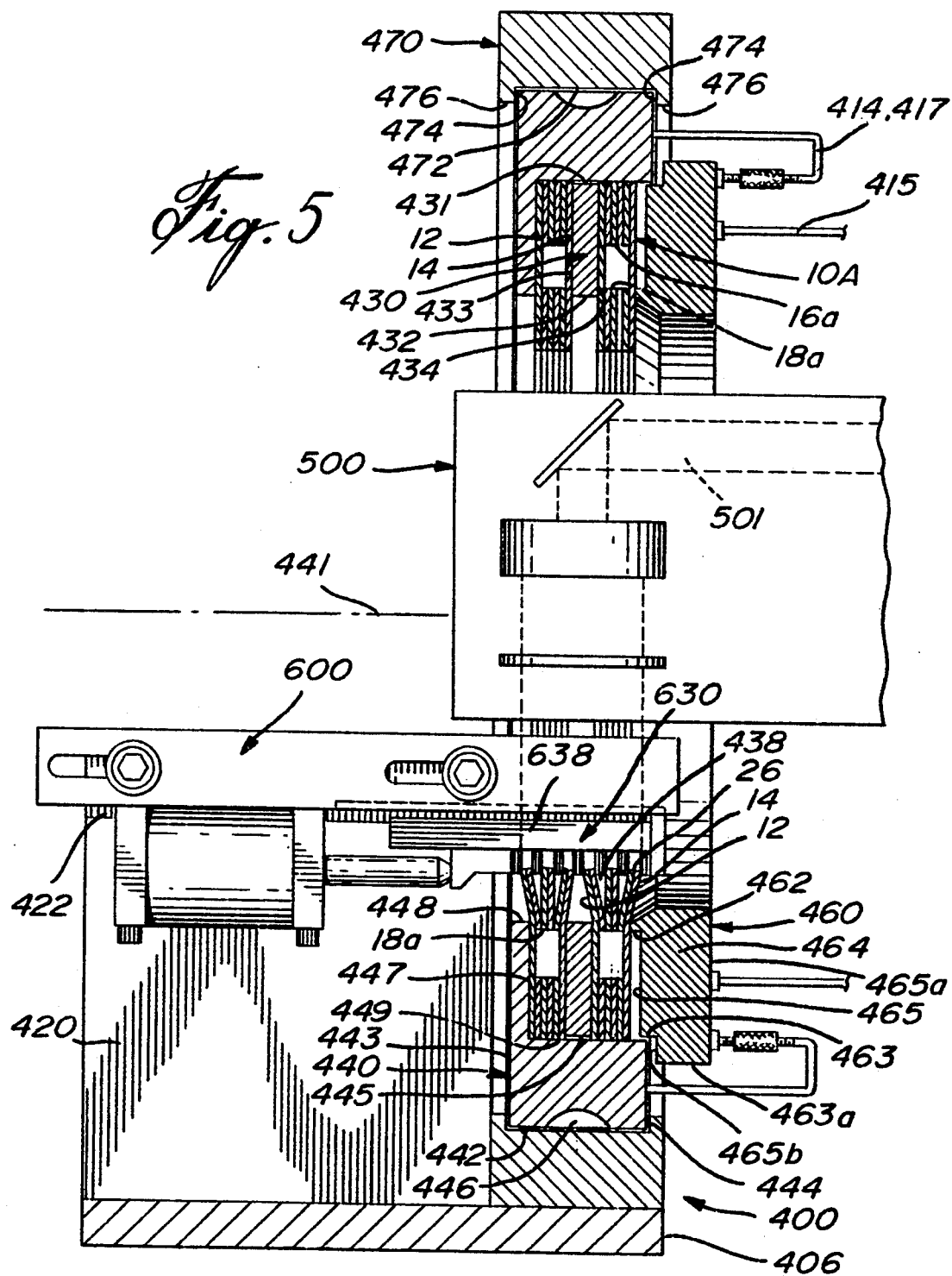
FIG. 5 is a fragmentary axial cross-section taken through a laser assembly welding jig for welding the inside diameter of the inner concentric stage of annular plates and end plates forming the bellows.

PHASE IV: Referring to FIGS. 1 and 5, inside diameters of end plate 12, internal stage 18 and end plate 14 of the pre-welded bellows 10a are welded at seams 26 to their respective adjacent counterparts to form bellows 10 at an assembly welding station 400 as will be described later.

PHASE I

Referring to FIGS. 1 and 2, sub-assembly welding station 100 includes an annular ring 140 journaled to a structure 170 for rotation therein, a base 106, a column 120, a clamping ring 160, and a comb assembly 600.

Structure 170 is mounted perpendicular to base 106 and provided with an internal annular wall 172 which is defined on each side by annular abutment walls 174. The internal radial dimension of annular wall 172 and the axial dimension between the abutment wall 174 are such as to allow annular ring 140 to rotate without having any significant radial or axial play. The central opening defined by inner rim 176 of annular abutment walls 174 is such that the clamping means 114, clamping ring 160, beam delivery system 500, and comb holder assembly 600 are allowed to be passed therethrough.

Annular ring 140 has a horizontal axis 141 comprising an external circumferential wall 142, an inboard radial wall 143, an outboard radial wall 144, and an internal annular wall 145. Gear teeth 146 are provided at the external circumferential wall 142 to match with a driving means (not shown). It is also contemplated to provide the inboard radial wall 143 with the proper gear teeth configuration to perform the same function. Instead of gear teeth 146, friction engagement may be contemplated. Driving means (not shown) which engages annular ring 140 and control means (not shown) provide the annular ring 140 with the specific desired rotational speed and the amount of rotations per welding cycle.

The internal wall 145 of annular ring 140 is defined, on the side adjacent to the inboard radial wall 143, by an annular abutment wall 147 and, on the side adjacent to the outboard radial wall 144, by a guiding wall 149. The inside diameter of the annular guiding wall 149 is such that it will allow the outer stage 16 to be slid in but will not allow significant radial play, and the axial dimension of the circumferential guiding wall 149 will be defined by the quantity of outer stage annular plates 19 to be welded therein.

The inside diameter 148 of the annular abutment wall 147 is such that it will allow the outer stage 16 to be bent slightly in the direction of the inboard radial wall 143 but will not allow the plates 19 in stage 16 to slide therethrough. Outboard radial wall 144 may be mounted with clamping means 114. It is also contemplated that a clamping force 115 may come from a source outside of the sub-assembly welding station; in that latter case, clamping means 114 would be replaced by a clamping ring holding means 117.

Clamping ring 160 includes, on the side facing the abutment wall 147 of annular ring 140, a pusher sleeve 162 and, on the side facing the clamping means 114, 115, stiffener ring 164.

The pusher sleeve 162 is adapted to slide inside the guiding wall 149 of ring 140, and the sleeve is allowed to move axially freely but with restricted radial play. The inside dimension of the pusher sleeve 162 is similar to the inside diameter 148 of abutment wall 147 allowing, in this way, the stage 16 to be bent slightly in the direction of the outboard radial wall 144. The axial dimension of pusher sleeve 162 of clamping ring 160 is such that when clamping ring 160 is forced against stage 16 by clamping means 114 or 115, stiffener ring 164 does not interfere with the outboard radial wall 144 of annular ring 140, and stage 16 is positively pressed against abutment wall 147 of annular ring 140.

Stiffener ring 164 is an extension of pusher sleeve 162 and integral therewith to form clamping ring 160 and is provided with two radial planar surfaces 165, 165a. The first radial planar surface 165 is adjacent to pusher sleeve 162, and the second radial planar surface 165a is on the other side of stiffener ring 164 in relation to first radial planar surface 165, and it faces clamping means 114 or clamping force 115, and the inside and outside diameters of stiffener ring 164 are such that stiffener ring 164 will not interfere with comb holder 600, beam delivery system 500, clamping means 114, or the abutment wall inside diameter 176 of structure 170.

Column 120 is mounted to base 106 on the side of the inboard radial wall 143 of annular ring 140 and provided with a planar surface 122 to receive comb assembly 600 as will be described later. Planar surface 122 is parallel to the axial axis 141 of annular ring 140 and perpendicular relative to base 106.

Figure 8:
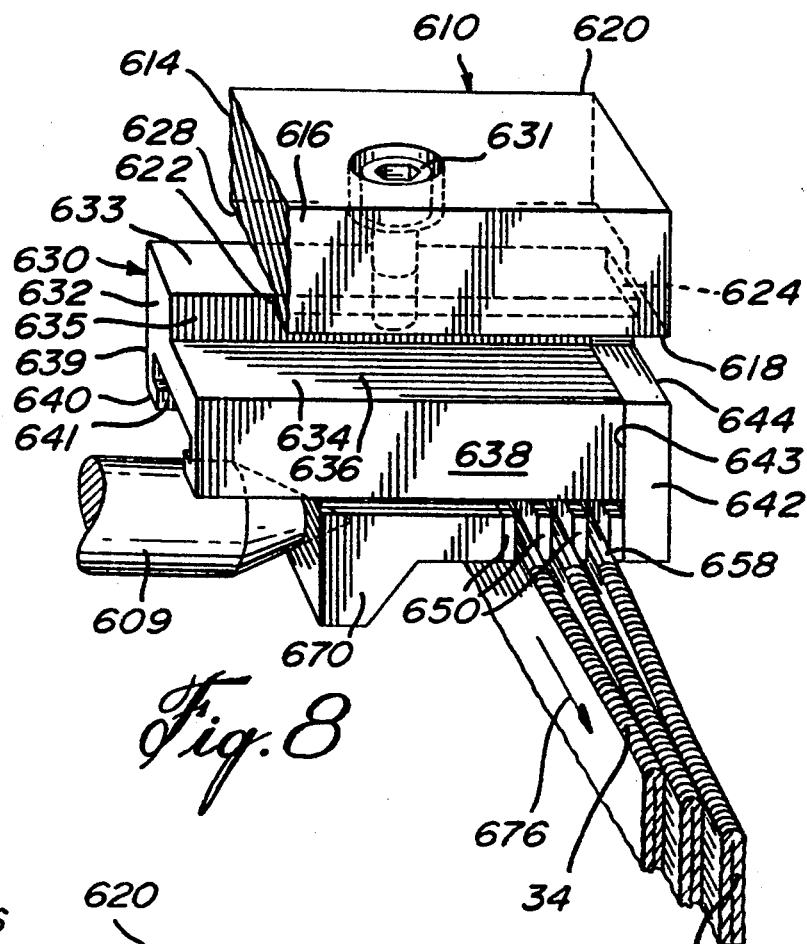
FIG. 8 is an enlarged fragmentary perspective view of a detail of the welding jig.
Figure 11:
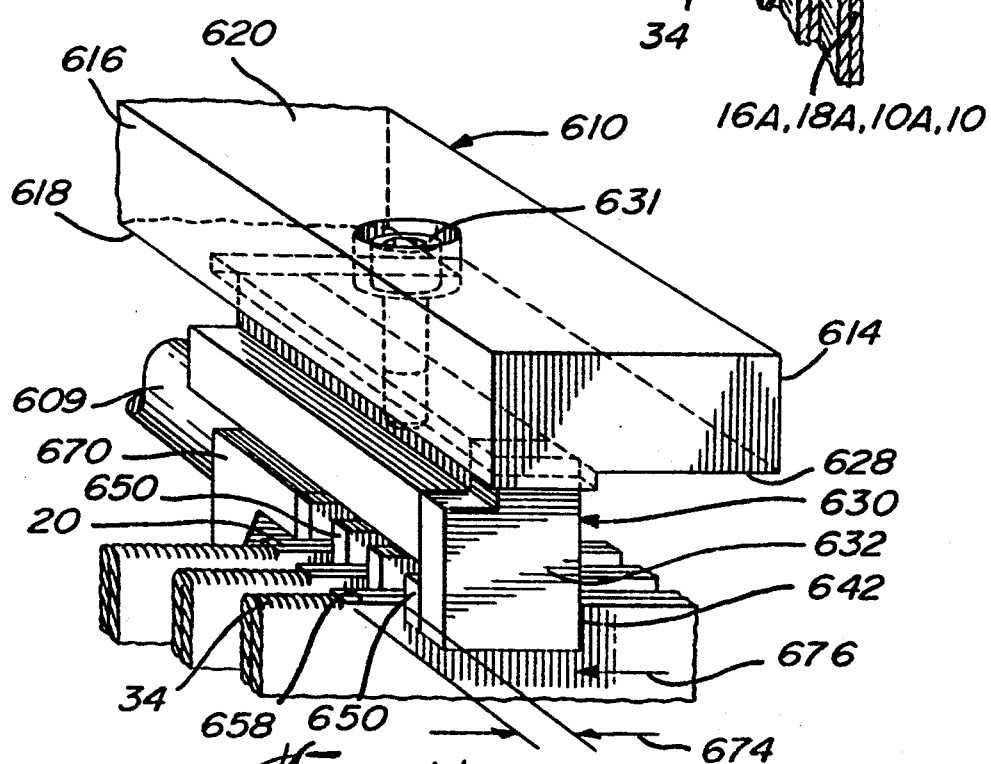
FIG. 11 is an enlarged fragmentary perspective view of a detail of the welding jig.

Comb assembly 600 will now be described in reference to FIGS. 2, 8, and 11. The comb assembly 600 includes a shank 610, a cylinder 608, cylinder mounting bolts 607, a blade holder assembly 630, and clamping bolt 631.

Shank 610 is a rectangular longitudinal bar provided with a first planar surface 614 to be mounted adjacent to the column planar surface 122. A second planar surface 616 is provided on the other side of the shank 610 relative to the first planar surface 614 and is parallel therewith. A third planar surface 618 is at right angles with the first and second planar surfaces 614, 616, and is parallel and faces base 106 when shank 610 is mounted to the column planar surface 122. A fourth planar surface 620 is provided on the top of the shank 610 and is parallel to the third planar surface 618. Longitudinal oblong slots 611, 611A pass through shank 610 between the first and second planar surfaces 614 and 616, and the slots are situated generally at the ends of shank 610 opposite inboard radial wall 143 of annular ring 140. When shank 610 is mounted to planar surface 122, the distance between slots 611 and 611A is such that shank 610 will be allowed limited axial movement relative to the mounting bolts 606. Planar surface 122 of column 120 is provided with tapped holes to receive mounting bolts 606. The other end of shank 610 relative to the first end is provided with a longitudinal recessed abutment wall 622 (FIG. 8), which is parallel and faces second planar surface 616 and is provided with a transversal recessed abutment wall 624. Abutment wall 624 is perpendicular and adjacent to abutment wall 622 and faces the second end of shank 610 to receive blade holder assembly 630 as will be described later.

Cylinder 608, as shown in FIG. 2, is a spring return, single action, fluid cylinder mounted by means of bolts 607 on the third planar surface 618 of shank 610. A piston 609 extends from the cylinder and faces blade holder assembly 630 to engage and release it as will be described later. The longitudinal axis of cylinder 608 is parallel to planar surfaces 616 and 618 of shank 610. Shank 610 is provided with tapped holes to receive bolts 607. Thus, when shank 610 is mounted to column 120, the longitudinal axis of cylinder 608 is parallel to axis 141 and perpendicular to the radial plane of annular ring 140. Cylinder 608 is provided with fluid inlet and control valves (not shown) to control the action and force of piston 609 against the blade holder assembly 630.

In a preferred embodiment, blade holder assembly 630 includes a blade holder 632, spacer blades 650, and a pusher block 670.

Blade holder 632 is in the form of a rectangular bar which had a first side 633 and an adjacent second side 638 cut longitudinally by a notch 634. The abutment wall 635 perpendicular to first side 633 and surface 636, both formed by notch 634, are such that when blade holder 632 is mounted to shank 610 by means of clamping bolts 631 in tapped hole 637. Abutment wall 635 of blade holder 632 sits against recessed abutment wall 622 of shank 610, and first side 633 sits on the surface 628 created between the recessed abutment walls 622 and 624. Second side 638 extends in front of second planar surface 616 of shank 610, and surface 636 of blade holder 632 does not interfere with third planar surface 618 of shank 610. Blade holder 632 is also provided with a third side 639 perpendicular to first side 633. A fourth side 640, parallel to first side 633, is provided with a longitudinal tee slot 641, parallel to sides 633, 638 or 639, to receive counterpart spacer blade 650 and pusher block 670 as will be described later. A first end of slot 641 faces piston 609 of cylinder 608 and a second end on the other side of the blade holder relative to the first end. The second end is provided with an end wall 642. End wall 642 is provided with two parallel planar surfaces 643, 644, and with the same transversal contour as the first three sides 638, 633, 639. The first planar surface 643, adjacent to second end of blade holder 632, extends beyond the fourth side 640 perpendicular to sides 638, 633, 639, such that it supports spacer blade 650 against axial forces as will be described later. A portion of second planar surface 644, which has the same dimension as the first planar surface 643, sits against recessed abutment wall 624 of shank 610 when blade holder 632 is mounted to shank 610. Thus, the longitudinal axis of blade holder 632 is parallel to axis 141 of annular ring 140 when holder 630 is mounted to shank 610.

As shown in FIG. 9, spacer blade 650 is provided with two planar parallel surfaces 651, 652. The outline thereof includes a tee section in the upper portion 653. The tee section is such that it engages longitudinally tee slot 641 of blade holder 632 freely but with limited transversal play when planar surfaces 651, 652 are projected perpendicular to sides 633, 638 or 639 of blade holder 632. A lower section 654 of spacer blade 650 is generally rectangular and projects at 655 from the base of the tee in the direction of side 638, such that when the spacer blade 650 is in blade holder 632, the end wall of projection 655 is substantially in the plane of side 638, and the upper edge of projection 655 clears surface 640 of blade holder 632 when spacer blade 650 is inserted in blade holder 632. The height 657 of the lower section 654, that is, the portion which extends below surface 640, is such as to engage between pairs of working pieces as will be described later. The lower portion 654 can have a nose section such as protrusion 656 which projects forwardly in the direction of side 639. The nose or protrusion 656 is such that when working pieces are separated by spacing blade 650, the pre-welded seam level 658 (FIGS. 11 and 8) is just above the upper edge of protrusion 656. The lower part of portion 654 of spacing blade 650 may be rectilinear (not shown) to separate rectilinear working pieces; concave, such as in the embodiment of FIG. 9, at 659 to separate circular working pieces at the outside diameter; or convex at 660 to separate annular working pieces at the inside diameter thereof.

Pusher block 670 is provided with generally the same transversal outline as the spacer blades 650, it being allowed to move longitudinally with limited transversal play. A first planar surface 671 is adjacent and parallel to spacer blade 650, while a second planar surface 672 is parallel to the first planar surface 671 and on the opposite end of the pusher block 670. The end 672 is larger than the end 671 to accommodate a conical recess 673 in order to receive piston 609 of cylinder 608 when cylinder 608 and blade holder 632 are mounted to shank 610, and pusher block 670 is inserted in the blade holder 632. The piston 609 is provided with a conical end to match cavity 673. The longitudinal distance between the first and second planar surfaces 671, 672 is such that when piston 609 is pressing on pusher block 670, planar surfaces 671, 672 are kept perpendicular to sides 638, 633 and 639 of blade holder 632.

Shapes other than a tee slot may be considered for blade holder 632, spacing blade 650, and pusher block 670 as long as the function is the same.

Having thus described the components of the welding station 100, reference will now be made to the loading and welding process of the station. In a first stage, a pair or a plurality of pairs of annular outer stages 16 are axially inserted, from the outboard radial wall 144, inside guiding wall 149 of annular ring 140 which allows stage 16 to be axially slid in freely but with limited radial play, thus keeping stages 16 concentric with an- nular ring 140. The pusher sleeve 162 of clamping ring 160 is inserted thereafter, and clamping means 114 is applied against the second radial surface 165a of stiffener ring 164 of clamping ring 160 such that clamping ring 160 pushes axially against stage 16 and against abutment wall 147 of annular ring 140 and frictionally engages stages 16 in unison with annular ring 140, thus engaging stages 16 to rotate in unison with annular ring 140. Each stage is made up of at least two pairs of annular plates 19.

Spacer blades 650 are then mounted in blade holder 632 with pusher block 670 making up blade holder assembly 630, and the spacer blades 650 are inserted between pairs of plates 19. First, the inside edges of the annular external stage 16 are arranged with the end wall 642 of blade holder 632 facing in the direction of clamping ring 160 and the longitudinal axis of blade holder assembly 630 being parallel to axis 141 of annular ring 140. The spacer blades 650 are then inserted with end wall 642 at one extremity followed by a spacer blade 650, a pair of plates 19, spacer blade 650, another pair of plates 19, and so on, to terminate with a spacer blade 650 and pusher block 670. The first and last spacer blade 650 adjacent to end wall 642 and pusher block 670 are used as friction blades.

A spacer ring 130 may be used between a pair or plurality of pairs of external sub-assemblies 16a, to compensate for axial deflection created by spacer blades 650, forming spaces 138. Given the linear speed of welding and fusion bath solidification time such that when a plurality of seams 34 are being welded simultaneously, as will be described, the individual fusion bath of each pair of sub-assemblies does not interconnect itself with the adjacent one before it solidifies due to the spacers 650. Spacer ring 130 is an annular ring provided with two radial, generally planar, parallel surfaces 133, 134, a circumferential wall 131, and an internal wall 132. The diameter of external circumferential wall 131 is such that the spacer ring 130 is allowed to slide freely inside guiding wall 149 but with limited radial play. The internal diameter of internal wall 132 is similar to the inside diameter 148 of abutment wall 147 of annular ring 140. The spacing apart of the two radial, generally planar surfaces 133, 134, determines the axial compensation of the stage 16.

Blade holder assembly 630 is mounted to shank 610 of comb assembly 600 by means of clamping bolt 631 (FIG. 8) and control valve of cylinder 608 is activated such that piston 609 of cylinder 608 engages longitudinally pusher block 670, thus pushing adjacent spacer blades 650 against adjacent pairs of plates 19 forming seams to be welded. Slots 611 and 611a of shank 610 provide the adjustment for the comb assembly 600 such that blade holder assembly 630 may be centered axially with the working pieces to be welded.

As seen in FIG. 2, laser beam delivery system 500 is moved inside the internal circumference of annular outer stage 16 such that the longitudinal axis 503a, 507a, 513a of laser oblong focal beam 505, 509, 515 (see FIGS. 2, 12a, 12b, 13a, 13b) is generally parallel to the longitudinal axis of second side 638 of blade holder 632 and generally perpendicular to the relative direction 676 of the working pieces to be welded and axially centered over the seams 20 or the plurality of seams to be welded, and the oblong focal beam 505, 509, 515 is slightly over the pre-welded seam level 658 (FIG. 11), and driving means is engaged such that annular ring 140 and stage 16 rotate in the relative direction 676. It is contemplated that the laser beam delivery system 500 can be moved into the inside of the annular stage 16 from the opposite direction, that is, from the left in the drawing shown in FIG. 2, along axis 141. Spacer blades 650 are frictionally engaged with plates 19 keeping seams to be welded together by means of the force applied by cylinder 608 to pusher block 670 thus to spacing blade 650 and separating the seams not to be welded between each other. The laser beam is energized such that a seam weld 34 or a plurality of seam welds 34 are produced simultaneously in front of blade holder assembly 630 at 20 to form outer stage sub-assembly 16a or a plurality of outer stage sub-assemblies 16a. The portions of the focal oblong beam 505, 509, 515, which happen to be facing spaces between welded seams 34 are defocused, thus losing focal density rapidly between the sides of the workpieces which are only slightly convergent.

When an outside clamping force 115 is used instead of clamping means 114, clamping force 115 is applied before the driving means is engaged.

Figure 10A:
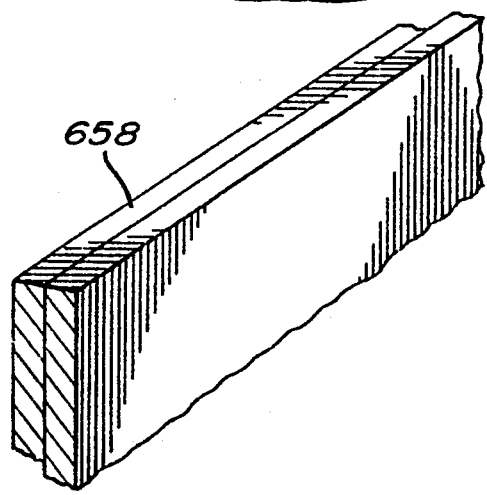
FIG. 10a is an enlarged fragmentary cross-section taken through a seam before welding.
Figure 10B:
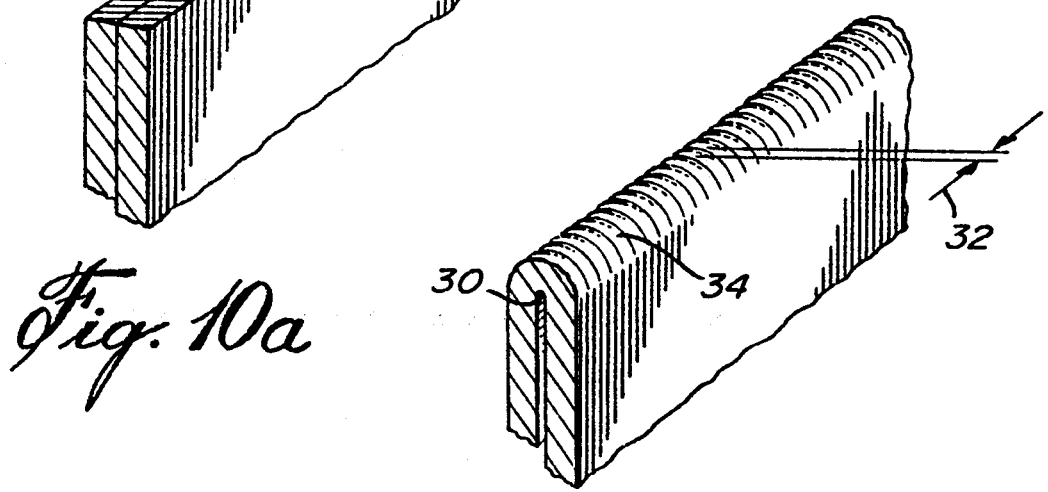
FIG. 10b is an enlarged fragmentary cross-section taken through a welded seam.

The distance 674 of the focal beam from second side 638 of blade holder 632 determines, up to the limit of capillarity of the molten material to be welded, the size of radius 30 (FIG. 10b). Laser pulse rate and linear welding speed determine welding pitch 32 of welded seam 34.

In the next two following steps, the process is inverted.

The laser beam is shut off, and the laser beam delivery system is pulled out of welding station 100.

Blade holder assembly 630 is withdrawn from shank 610 and away from stage 16a. Clamping means 114 and clamping ring 160 are removed, and the outer stage sub-assembly 16a is removed from ring 140.

Referring now to FIGS. 6, 8, 9, 10, and 11, another embodiment using an electron beam welding technique is described instead of a laser welding technique. An electron beam gun 700 is pointed at the workpieces to be welded in front of side wall 638 of blade holder 632, and after the driving means is engaged, the electron beam is energized and swept generally parallel to side wall 638 of blade holder 632 relatively from the pusher block 670 side to the end wall 642 side and then de-energized to return to the pusher block 670 side, where it is re-energized again to sweep in the direction of the end wall 642 side, and so on. This beam scanning technique allows a seam or a plurality of seams to be welded practically simultaneously. The high speed scanning gives a similar result as with an oblong laser beam pulsing at a scanning frequency. The scanning direction may be reversed when the electron beam gun 700 is generally perpendicular to axis 141.

The distance 674 of the focal beam from the side 638 of blade holder 632 determines up to the limit of capillarity of the molten material to be welded, the size of radius 30 (FIG. 10a); electron beam scanning rate and linear welding speed determine welding pitch 32 of welded seam 34.

PHASE II

Referring to FIGS. 1, 3, 8, 9, 10, and 11, welding station 200 includes an annular ring 240 journaled to an axle 270 for rotation thereabout, a post 203 integrated to axle 270, a base 206, a column 220, a clamping ring 260, and a comb assembly 600. In Phase II, those elements which are similar to elements in Phase I have been identified by corresponding numerals, which have been raised by 100.

Axle 270 is mounted to post 203, and post 203 is mounted to base 206 such that axis 271 of axle 270 is parallel to base 206, and axle 270 is provided with an external circumferential wall 272 which is defined on each side by annular abutment walls 274. The external dimension of circumferential wall 272 and the axial dimension between the abutment wall 274 are such as to allow the annular ring 240 to rotate without having radial or axial significant play. The outside diameter 276 of the annular abutment walls 274 is such as to allow the clamping means 214, clamping ring 260, beam delivery system 500, and comb holder assembly 600 to be passed thereabout.

Annular ring 240 comprises an internal annular wall 242, an inboard radial wall 243, an outboard radial wall 244, and an external circumferential wall 245. Gear teeth 246 are provided at the internal wall 242 to be engaged with a driving means (not shown).

The external circumferential wall 245 of annular ring 240 is defined, on the side adjacent to the inboard radial wall 243, by an annular abutment wall 247 and, on the side adjacent to the outboard radial wall 244, by a circumferential guiding wall 249. The outside diameter of the guiding wall 249 is such that it will allow the internal stage 18 to be slid over but will not allow significant radial play, and the axial dimension of the guiding wall 249 will be defined by the quantity of external plates to be welded in a given stage sub-assembly.

The outside diameter 248 of the annular abutment wall 247 is such that it will allow the internal stage 18 to be bent slightly in the direction of the inboard radial wall 243 but will not allow the plates to slide thereabout. Outboard radial wall 244 may be mounted with clamping means 214. It is also contemplated that the clamping force 215 may come from a source outside of the sub-assembly welding station; in the latter case, clamping means 214 would be replaced by a clamping ring holding means 217.

Clamping ring 260 includes, on the side facing abutment wall 247 of annular ring 240, a pusher sleeve 262 and, on the side facing clamping means 214, 215, a stiffener ring 264.

The pusher sleeve 262 is similar to pusher sleeve 162 and operates in the same manner. The axial dimension of the clamping ring pusher sleeve 262 is such that when clamping ring 260 is forced against stage 18 by clamping means 214 or 215, stiffener ring 264 does not engage the outboard radial wall 244 of annular ring 240, and stage 18 is positively pressed against abutment wall 247 of annular ring 240 by means of sleeve 262.

Column 220 is mounted to base 206 on the side of the inboard radial wall 243 of annular disc 240 and is provided with a planar surface 222 to receive comb assembly 600 as has already been described in relation to Phase I. Planar surface 222 is parallel to the horizontal axis 271 of axle 270 and perpendicular relative to base 206.

Comb assembly 600, described in Phase I, is mounted to planar surface 222 in the same manner as described, that is, it is mounted to planar surface 122 of column 120.

Having thus described the components of the welding station 200, reference will now be made to the loading and welding process of said station.

A pair of plates or a plurality of pairs of annular plates forming stage 18 are axially inserted, from the outboard radial wall 244 on guiding wall 249 of annular ring 240. Pusher sleeve 262 of clamping ring 260 is inserted thereafter, and clamping means 214 is applied against the second radial surface 265a of stiffener ring 264 of clamping ring 260 such that clamping ring 260 pushes the plates of stage 18 against abutment wall 247 of annular ring 240 and frictionally engages the plates of stage 18 in unison with annular ring 240, thus engaging the annular plates to rotate in unison with annular ring 240.

Spacer blades 650 are mounted in blade holder 632 with pusher block 670 to form blade holder assembly 630. The spacer blades 650 are inserted between pairs of plates of stage 18 in the same manner as with stage 16 in Phase I.

Spacer ring 230 may be used between a pair or a plurality of pairs of internal plates, to compensate for radial deflection created by spacing blade 650.

The welding equipment or technique used in Phase II are identical to Phase I.

Laser beam delivery system 500 is moved outside the external circumference of annular internal stage 18 such that the laser oblong focal beam or plurality of oblong focal beams are longitudinally generally parallel to the longitudinal axis of the side 638 of blade holder 632 and generally perpendicular to the relative direction 676 of the working pieces to be welded and axially centered over the seams or the plurality of seams to be welded. The driving means engages such annular ring 240, and plates 18 rotate in the direction 676 from side 639 to side 638 of blade holder 632, and the laser beam is energized such that a seam weld 34 or a plurality of seam welds 34 are produced simultaneously in front of blade holder assembly 630 at 22 to produce an internal stage sub-assembly 18a or a plurality of sub-assemblies 18a.

In the next two following steps, the process is inverted.

The laser beam is cut off, and the laser beam delivery system is pulled away from the welding station 200.

Blade holder assembly 630 is withdrawn from shank 610 and away from stage 18. Clamping means 214 and clamping ring 260 are removed, and the internal stage sub-assembly 18a is pulled off of annular ring 240.

In an alternative embodiment according to FIGS. 7, 8, 9, 10, and 11, an electron beam gun 700 is pointed at the outside diameter of internal stage 18 to be welded, generally perpendicular to axis 271 of axle 270. The electron beam welding technique is the same as described in Phase I.

PHASE III

Referring to FIGS. 1 and 4, assembly welding station 300 includes an annular ring 340 journaled to an axle 370 for rotation therewith. A post 303 is integrated to axle 370 on a base 306. A column 320 mounts clamping ring 360 and a comb assembly 600.

Axle 370 is mounted to post 303 and post 303 is mounted to base 306 such that axis 371 of axle 370 is parallel to base 306, and axle 370 is provided with an external circumferential wall 372 which is defined on each side by annular abutment walls 374. The external dimension of circumferential wall 372 and the axial dimension between the abutment wall 374 are such as to allow the annular ring 340 to rotate without having radial or axial significant play. The outside diameter 376 of the annular abutment walls 374 is such that it allows the clamping means 314, clamping ring 360, beam delivery system 500, and comb holder assembly 600 to be moved. Like elements in Phase III compared to Phases I and II have been identified by numerals which have been raised by 100 as compared with Phase II.

Annular ring 340 comprises an internal wall 342, an inboard radial wall 343, an outboard radial wall 344, and an external circumferential wall 345.

The external circumferential wall 345 of annular ring 340 is defined, on the side adjacent to the inboard radial wall 343, by an annular abutment wall 347 and, on the side adjacent to the outboard radial wall 344, by a guiding wall 349. The outside diameter of the guiding wall 349 is such that it will allow end plates 12 and 14 and the internal stage subassembly 18a to be slid in but will not allow significant radial play, and the axial dimension of the guiding wall 349 will be defined by the quantity of pre-welded bellows 10a to be welded at one time.

The outside diameter 348 of the annular abutment wall 347 is such that it will allow the end plate 12 and external stage 16 to be bent slightly in the direction of the inboard radial wall 343 but will not allow external stage 16 to slide thereabout. Outboard radial wall 344 may be mounted with clamping means 314.

Clamping ring 360 includes, on the side facing abutment wall 347 of annular ring 340, a pusher sleeve 362 and, on the side facing clamping means 314, 315, a stiffener ring 364.

The inside diameter of pusher sleeve 362 is such that it does not interfere with the outside diameter of guiding wall 349 of annular ring 340. The outside dimension of the pusher sleeve 362 is similar to the abutment wall outside diameter 348 allowing the end plate 14 and stage 16 to be bent slightly in the direction of the outboard radial wall 344. The axial dimension of the clamping ring pusher sleeve 362 is such that when clamping ring 360 is forced against adjacent end plate 14, by means of clamping means 314 or 315, external stage sub-assembly 16a and end plates 12 and 14 are positively pressed against abutment wall 347 of annular ring 340.

First radial planar surface 365 is adjacent to pusher sleeve 362, and second radial planar surface 365a, on the other side of stiffener ring 364, faces clamping means 314, and the inside diameter of stiffener ring 364 is adapted to slide along guiding wall 349.

Column 320 is mounted to base 306 on the side of the inboard radial wall 343 of annular disc 340 and is provided with a planar surface 322 to receive comb assembly 600. Planar surface 322 is parallel to the axial axis 371 of axle 370 and perpendicular to base 306.

Comb assembly 600, described in Phase I, is mounted to planar surface 322.

Having thus described the components of the welding station 300, reference will now be made to the loading and welding process of this station.

Pre-welded bellows 10a, annular end plate 12, internal stage sub-assembly 18a, external stage sub-assembly 16a, and annular end plate 14 are axially inserted in this order, from the outboard radial wall 344. Outside guiding wall 349 of annular ring 340 retains end plates 12, 14 and sub-assembly 18a with limited radial play, thus keeping sub-assembly 18a and end plates 12, 14 concentric with annular ring 340. A temporary guiding means (not shown) may be used to radially center outer sub-assembly 16a with end plates 12, 14, thus keeping external sub-assembly 16a concentric with annular ring 340. Pusher sleeve 362 of clamping ring 360 is inserted thereafter, and clamping means 314 is applied against the second radial surface 365a of stiffener ring 364 of clamping ring 360 such that clamping ring 360 axially pushes end plates 12 and 14 and external sub-assembly 16a against abutment wall 347 of annular ring 340 and frictionally engages covers 12, 14 and external sub-assembly 16a in unison with annular ring 340, thus engaging end plates 12, 14 and external sub-assembly 16a to rotate in unison with annular ring 340.

Spacer blades 650 are mounted in blade holder 632 with pusher block 670 to form blade holder assembly 630. The spacer blades 650 are inserted between pairs of plates at the circumference of the annular end plates 12, 14 and external sub-assembly 16a, with the end wall 642 of blade holder 632 facing in the direction of clamping ring 360. Spacer blades 650 are inserted against end wall 642, adjacent end plate 14 and one plate of external sub-assembly 16a. The spacer blades 650 are then inserted next to each pair of plates to terminate with a plate from outer sub-assembly 16a and end plate 12 as a pair and a spacer blade 650 and then pusher block 670. The first and last spacer blade 650 adjacent to end wall 642 and pusher block 670 are used as friction blades.

Spacer ring 330 may be used between pre-welded bellows 10a or a plurality of pre-welding bellows 10a, to compensate for radial deflection created by spacer blade 650.

Blade holder assembly 630 is mounted to shank 610 of comb assembly 600 by means of clamping bolt 631, and control valve of cylinder 608 is activated such that piston 609 of cylinder 608 engages longitudinally pusher block 670, thus pushing adjacent spacing blade 650 against an adjacent counterpart which pushes against its adjacent counterpart to be welded which pushes adjacent spacing blade 650 and so on up to the relative last spacing blade which sits against end wall 642.

Welding equipment or technique used in Phase III are identical to Phase I.

Laser beam delivery system 500 is, relatively to sub-assembly welding station 300, moved outside the external circumference of annular pre-welded bellows 10a such that the laser oblong beam or plurality of oblong focal beams are longitudinally generally parallel to side 638 of blade holder 632 and generally perpendicular to the relative direction 676 of the working pieces to be welded and axially centered over the seams 34 or the plurality of seams 34 to be welded. Driving means are then engaged with annular ring 340, and pre-welded bellows 10a rotates in the direction 676 relatively from side 639 to side 638 of blade holder 632, and the laser beam is energized such that a plurality of seam welds are produced simultaneously in front of blade holder assembly 630 at 24 to form pre-welded bellows 10a.

The laser beam is shut off, and the laser beam delivery system is withdrawn from welding station 300.

Blade holder assembly 630 is pulled out of shank 610 and out of pre-welded bellows 10a, clamping means 314 and clamping ring 360 are taken off, and pre-welded bellows 10a or a plurality of pre-welded bellows 10a are pulled out of annular ring 340.

PHASE IV

Referring to FIGS. 5, 8, 9, 10, and 11, assembly welding station 400 includes an annular ring 440 journaled to a structure 470 for rotation therein, including column 420 mounted on a base 406. A clamping ring 460 and a comb assembly 600 are also provided. Elements which correspond to elements in Phases I, II and III have numerals which have been raised by 100 as compared to Phase III.

Structure 470 is mounted perpendicular to base 406 and is provided with an internal annular wall 472 which is defined on one side by annular abutment wall 474. The internal dimension of annular wall 472 and the axial dimension of the abutment wall 474 are such that the annular ring 440 is permitted to rotate without having significant radial or axial play. The inside diameter 476 of the annular abutment walls 474 is such that it allows the clamping means 414, clamping ring 460, beam delivery system 500, and comb holder assembly 600 to be passed therethrough.

Annular ring 440, provided with axial axis 441, comprises an external circumferential wall 442, an inboard radial wall 443, an outboard radial wall 444, and an internal annular wall 445. Gear teeth 446 are provided at the external circumferential wall 442.

The internal annular wall 445 of ring 440 is defined, on the side adjacent to the inboard radial wall 443, by an annular abutment wall 447 and, on the side adjacent to the outboard radial wall 444, by a guiding wall 449. The inside diameter of the guiding wall 449 is such that it will allow the pre-welded bellows 10a to be slid in but will not allow significant radial play, and the axial dimension of the guiding wall 449 will be defined by the quantity of pre-welded bellows 10a to be welded therein.

The inside diameter 448 of the annular abutment wall 447 is such that it will allow end plates 12 and stage 18 to be bent slightly in the direction of the inboard radial wall 443 but will not allow internal stage 18 to slide therethrough. Outboard radial wall 444 may be provided with clamping means 414.

Clamping ring 460 includes, on the side facing abutment wall 447 of annular ring 440, a pusher sleeve 462 and, on the side facing clamping means 414, 415, a stiffener ring 464.

The outside diameter of pusher sleeve 462 is such that it does not interfere with the inside diameter of guiding wall 449 of annular ring 440. The inside dimension of the pusher sleeve 462 is similar to the abutment wall inside diameter 448 allowing the stage 18 or end plate 14 to be bent slightly in the direction of the outboard radial wall 444. The axial dimension of the clamping ring pusher sleeve 462 is such that when clamping ring 460 is forced against adjacent end plate 14 by means of clamping means 414 or 415, internal sub-assembly 18a and end plates 12 and 14 are positively pressed against abutment wall 447 of annular ring 440.

Stiffener ring 464 is an extension of pusher sleeve 462 and integral thereto to form clamping ring 460 and is provided with three radial planar surfaces 465, 465a, 465b. The first radial planar surface 465 is adjacent to pusher sleeve 462, and the second radial planar surface 465a is on the other side of stiffener ring 464 in relation to the first radial planar surface 465 and faces clamping means 414. The external circumference of stiffener ring 464 is provided with two circumferential walls 463, 463a. The first circumferential wall 463, adjacent to first planar surface 465, is adapted to slide inside the guiding wall 449. The axial dimension of first circumferential wall 463 is such that when clamping ring 460 is forced against adjacent end plate 14, third radial surface 465b connecting the two circumferential walls 463, 463a, does not interfere with outboard radial wall 444 of annular ring 440, and the outside diameter of the second circumferential wall 463a is such that second circumferential wall 463a will not intervene with clamping means 414 or the abutment wall inside diameter 476 of structure 470. The inside diameter of stiffener ring 464 is such that it does not interfere with comb holder assembly 600 or the beam delivery system 500.

Comb assembly 600, described in Phase I, is mounted to planar surface 422.

A pre-welded bellows 10a is axially inserted from the outboard radial wall 444 inside guiding wall 449 of annular ring 440. A temporary guiding means (not shown) is inserted at the inside diameter of end plates 12, 14 and internal sub-assembly 18a, thus keeping the internal sub-assembly concentric with annular ring 440. Pusher sleeve 462 of clamping ring 460 is then inserted thereafter, and clamping means 414 is applied against the second radial surface 465a of stiffener ring 464 of clamping ring 460 such that clamping ring 460 axially pushes end plates 12 and 14 and internal sub-assembly 18a against abutment wall 447 of annular ring 440 and frictionally engages end plates 12, 14 and internal sub-assembly 18a in unison with annular ring 440, thus engaging covers 12, 14, and internal sub-assembly 18a to rotate in unison with annular ring 440. The temporary guiding ring is then removed.

Spacer blades 650 mounted in blade holder 632 are inserted between pairs of plates at the inside circumference of annular end plates 12, 14 and internal sub-assembly 18a. Spacer blades 650 are inserted with end wall 642 adjacent a spacer blade 650 and next to an end plate 14 and one plate of internal sub-assembly 18a. A spacer blade 650 is then inserted, and then a pair of plates to terminate with a plate from internal sub-assembly 18a and end plate 12 and then spacer blade 650 and pusher block 670. The first and last spacing blade 650 adjacent to end wall 642 and pusher block 670 are used as friction blades.

Spacer ring 430 may be used between pre-welded bellows 10a or a plurality of pre-welded bellows 10a, to compensate for radial deflection created by spacer blade 650.

Blade holder assembly 630 is mounted to shank 610 of comb assembly 600 by means of clamping bolt 631, and control valve of cylinder 608 is activated such that piston 609 of cylinder 608 engages longitudinally pusher block 670, thus pushing adjacent spacing blade 650 against an adjacent counterpart which pushes against its adjacent counterpart to be welded which pushes adjacent spacer blade 650 and so on up to the relative last spacer blade which finally sits against end wall 642.

Laser beam delivery system 500 is moved inside the annular pre-welded bellows 10a such that the laser oblong beam or plurality of oblong focal beams are longitudinally generally parallel to side 638 of blade holder 632 and generally perpendicular to the direction 676 of the working pieces to be welded and axially centered over the seams or the plurality of seams to be welded. Driving means is engaged to rotate annular ring 440 and pre-welded bellows 10a in the direction 676 from side 639 to side 638 of blade holder 632. The laser beam is energized such that a plurality of weld seams are produced simultaneously in front of blade holder assembly 630 at 26 to produce bellows 10.

The laser beam is shut off, and the laser beam delivery system is pulled out of welding station 400.

Blade holder assembly 630 is withdrawn out of shank 610 and out of bellows 10. Clamping means 414 and clamping ring 460 are taken off, and the bellows 10 is pulled out of annular ring 440.

It has also been contemplated that the column 120, 220, 320, 420 and comb assembly 600 may be located on the side adjacent to outboard radial wall 144, 244, 344, 444.

Other pusher means may be contemplated instead of cylinder 608 as long as the function of compressing the spacer blades against adjacent workpieces to be welded such that the workpieces to be welded are held together and kept apart between each other up to the welded seams 34 have solidified.

I claim:

1. A method of welding simultaneously a plurality of parallel seams, including the steps of defining a welding station including a radiation welding source and determining a working plane within the focal depth of the radiation source and spaced from the radiation welding source, wherein the working plane intersects a plane containing the radiation welding source, spanning, with the radiation welding source, a welding zone at the intersection of the working plane and the plane containing the welding source, maintaining a plurality of seams to be welded spaced apart and parallel, moving at least one of the welding station and the plurality of seams to be welded, in unison, relative to one another such that the plurality of seams to be welded passes through the welding zone, energizing the radiation welding source, whereby the welded seams are formed simulataneously.

2. A method as defined in claim 1, wherein the radiation welding source is an electron beam welder wherein the electron beam is scanned transversally of the direction of movement and spans the welding zone.

3. A method as defined in claim 1, wherein the radiation welding source is a laser beam delivery system, the laser beam forming an oblong pattern at least spanning the welding zone.

4. A method of welding as defined in claim 1, wherein the plurality of seams to be welded is formed on workpieces which are in the form of sheets, and each pair of the sheets being held together to form a seam to be welded along contiguous edges of the sheets, a plurality of pairs of sheets being held in spaced-apart parallel relationship with the seams to be welded which are maintained in an exposed condition to be passed through the welding zone.

5. A method of welding as defined in claim 4, wherein the welding station is stationary and the pairs of workpiece sheets held together are moved through the welding zone relative to the welding station.

6. A method of welding a seam, including the steps of defining a welding station including a laser beam delivery system for providing a laser beam and determining a working plane within the focal depth of the laser beam and spaced from the laser beam delivery system, wherein the working plane intersects a plane containing the laser beam, passing the laser beam through a first optical element which projects the beam to form an oblong pattern at the working plane, defining a welding zone at the intersection of the working plane and the plane containing the laser beam, spanning the welding zone to weld the seam by the laser beam, moving at least one of the welding stations and the seam to be welded relative to one another such that the seam to be welded passes through the welding zone, energizing the laser beam delivery system, whereby the welded seam is formed.

7. A method as defined in claim 6, including passing the laser beam through a divider means which divides the beam into a plurality of beams, passing the plurality of beams through a further focal lens means to modify the beam to form at least a focused oblong pattern with the major axis of the oblong pattern coincident with the welding zone.

8. A method as defined in claim 7, wherein a plurality of beams is generally parallel and the distance between the beam divider means and the focal lens means can be changed without affecting the oblong pattern of the focused beam.

9. A method as defined in claim 7, wherein the plurality of beams is generally convergent and whereby the dimension of the oblong pattern of the focused beam along the major axis thereof can be varied in the focal plane at the welding zone by adjusting the distance between the beam divider means and the focal lens means.

10. A method as defined in claim 7, wherein the plurality of beams is substantially divergent such that the dimension of the oblong shaped pattern along the major axis of the oblong can be adjusted by varying the distance between the beam divider means and the focal lens means.

11. A method of manufacturing an annular bellows, including the steps of first preparing first and second annular end plates having outer and inner diameters, providing an outer stage of annular plates each having an outer diameter similar to the outer diameter of the first and second end plates, providing an inner stage of annular plates each having an inner diameter similar to the inner diameter of the first and second end plates; first, welding together one of the outer and inner stages by first joining adjacent pairs of the plates to form seams to be welded along the inner edges of the outer stage and the outer edges of the inner stage respectively, defining a welding station including a radiation welding source and a working plane at the welding station spaced from the radiation welding source within the focal depth of the welding source, and wherein the working plane intersects a plane containing the welding source, the radiation welding source spanning a welding zone at the intersection of the working plane and the plane containing the welding source, maintaining the seams to be welded of the pairs of plates spaced apart and parallel, moving said one of the outer and inner stages of the plates in a circular locus relative to the welding station such that the seams to be welded pass through the welding zone at the welding station, whereby the plurality of seams are continuously welded on the inner edges of the plates of the outer stage while the seams to be welded are maintained parallel and spaced apart to form an outer sub-assembly and on the outer edges of the plates of the inner stage to form an inner sub-assembly; second, welding the other of the outer and inner stages; third, assembling the first and second end walls with the outer and inner sub-assemblies sandwiched therebetween and forming seams to be welded with pairs of the respective outer edges of the end plates and adjacent plates of the outer sub-assembly while maintaining the pairs of seams to be welded in spaced-apart and parallel relationship, and passing the seams to be welded through the welding zone in a circular locus, and forming seams to be welded with the inner edges of the end plates and the adjacent plates of the inner sub-assembly and intervening plates, maintaining the seams to be welded in spaced-apart parallel relationship and passing the seams to be welded through the welding zone in a circular locus, whereby at least an assembled bellows is formed.

12. A method as defined in claim 11, wherein the radiation welding source is an electron beam, wherein the electron beam is scanned generally transversally relative to the direction of the travel of the seams to be welded, and whereby the plurality of welded seams is produced virtually simultaneously.

13. A method as defined in claim 11, wherein the radiation welding source is a laser beam delivery system including a lens means whereby the laser beam is transformed at the working plane to at least a generally oblong pattern coincident with the welding zone and transversal to the direction of the seams to be welded, whereby a plurality of welded seams are produced simultaneously.

14. A method as defined in claim 2 or 12, wherein an electron beam gun is pointed at the welding zone and the electron beam is energized and is swept transversally of the direction of travel of the seams to be welded and is then de-energized and returned to its original position where it is re-energized again to sweep in the transverse direction.

15. A method as defined in claim 11, wherein the welding station is placed externally of the inner subassembly when the outer edges of the inner sub-assembly are being welded and externally of the assembled bellows when the seams of the outer edges of the outer sub-assembly and the end plates are being welded with the welding zone coincident with a circular locus of the outer edges of the respective sub-assemblies, and the welding station is partially located in a central opening formed by the annular sub-assemblies when the inner edges of the outer sub-assembly are being welded and the inner edges of the assembled bellows are being welded.

16. A method as defined in claim 11, wherein the bellows to be formed is assembled from first and second end plates, outer and inner sub-assemblies, with each sub-assembly including at least a pair of annular plates, such that at least two welded seams are formed on the outer edges of the outer sub-assembly and the inner edges of the inner sub-assembly with the end plates, and at least one welded seam is formed on the inner edges of the outer sub-assembly and the outer edges of the inner sub-assembly.

17. A method as defined in claim 11, wherein during the step of welding the outer sub-assembly and inner sub-assembly, a plurality of sub-assemblies can be assembled by providing spacers between adjacent sub-assemblies passing through the welding zone.

18. An apparatus for welding simultaneously a plurality of parallel seams to join several workpieces in pairs, including jig means for maintaining the workpieces and for holding the workpieces and the seams to be welded in spaced-apart and parallel relationship, welding means including a radiation welding source and a working plane spaced apart from the radiation welding source and within the focal depth of the welding source, means mounting the welding source in a plane intersecting the working plane, means associated with the welding station such that the welding source can span a welding zone at the intersection of the working plane and the plane containing the welding source, means for moving one of the welding station and the jig such that the seams to be welded pass through the welding zone whereby a plurality of welded seams are formed simultaneously.

19. An apparatus as defined in claim 18, whereby the workpieces are in the form of thin plates having edges and the welded seams are to be formed at the contiguous edges of pairs of plates.

20. An apparatus as defined in claim 18, wherein the means for maintaining the seams spaced apart and parallel include a comb assembly mounted on the jig means wherein the comb includes a first holder means and abutment means and a plurality of spacer plates held by the holder means, the holder means having a longitudinal axis and the spacer plates are movable in the longitudinal axis of the holder but retained against movement in other directions, the holder means being mounted such that the longitudinal axis thereof extends transversally of the direction of movement of the seams to be welded and is located adjacent the welding zone, the spacer plates being inserted between pairs of workpieces at the seams to be welded, and means for applying pressure on the spacer plates in the longitudinal axis of the holder for maintaining the edges of the pairs forming the seams to be welded close together as they enter the welding zone.

21. An apparatus as defined in claim 20, wherein the means for maintaining the seams spaced apart and parallel include the holder means defined by a block with a track defined in the longitudinal axis of the holder and the spacer plates can slide in the track in the holder in the longitudinal axis but are retained against movement in the direction of travel of the seams to be welded, and a piston and cylinder arrangement is provided in the longitudinal axis of the holder with the cylinder mounted to the comb assembly and the piston adapted to abut one of the spacer plates in a series whereby pressure is transmitted from a first spacer blade to a pair of workpieces to be welded to a further spacer blade and then to a further pair of workpieces to be welded, and so on, against the abutment means on the holder, and the workpieces forming seams to be welded move relative to the comb into the welding zone adjacent to the holder.

22. An apparatus as defined in claim 18, wherein the workpieces are in the form of annular plates having outer and inner circular edges with the inner edge defining a circular opening, the jig including a first stationary frame member in an annular wheel rotatable in the frame member, the wheel having seat means for receiving the annular plates to be welded, clamp means are associated with the wheel means for clamping the plates to be welded with the wheel such that when the wheel rotates within the fixed frame, the plates rotate with the wheel with predetermined edges of the plates passing through the welding zone.

23. An apparatus as defined in claim 22, wherein the wheel, in the case of welding the outer edges of the annular plates, has a circumferentially defined seat for receiving the inner edges of the plates so that the outer edges are exposed.

24. An apparatus as defined in claim 22, wherein the wheel has an internal seat for receiving the annular plates such that the outer edges of the annular plates are received within the seat in the wheel and the inner edges of the annular plates are exposed.

25. An apparatus as defined in claim 23, wherein the jig is provided for assembling a bellows, wherein the bellows is made up of a pair of end plates sandwiching an outer sub-assembly of annular plates having an outer diameter similar to the outer diameter of the end plates, and an inner sub-assembly made up of annular plates having an inner diameter the same as the inner diameter of the end plates, the wheel having a seat about the outer periphery thereof adapted to receive an assembly of the end plates sandwiching the sub-assemblies such that the outer diameter edges of the end plates and sub-assemblies are exposed and pass through the welding zone, and clamp means are provided on the wheel adapted to clamp the end plates and the sub-assemblies for forming the bellows.

26. An apparatus as defined in claim 24, wherein the wheel has an inner seat adapted to receive a pair of annular end plates sandwiching pairs of outer and inner sub-assemblies of annular plates for forming a bellows, wherein the end plates and the inner and outer sub-assemblies are held within the seat of the wheel with the inner edges of the end plates and inner sub-assembly inner edges being exposed and adapted to pass through the welding zone, and clamp means for clamping the end plates and the inner and outer sub-assemblies in the seat defined in the wheel.

27. An apparatus as defined in claim 23, wherein the welding station includes a movable base member to which the welding source is movably mounted relative to the base, the movable base member being adapted to move to a position adjacent the outer periphery of the wheel in the jig such that the welding zone can be located at the outer edges of the plates adjacent the means for maintaining the seams spaced apart and downstream thereof.

28. An apparatus as defined in claim 24, wherein the welding station includes a welding head which is movable relative to the jig and which can be inserted within the opening defined by the inner edges of the plates mounted in the jig, and the head including the welding source arranged such that the welding zone is at the inner edges of the seams to be welded.

29. An apparatus as defined in claim 18, 19, 27 or 28, wherein the welding source is an electron beam generating means wherein the electron beam is scanned transversely of the direction of movement of the seams to be welded, in the welding zone such that a plurality of welded seams are produced virtually simultaneously.

30. An apparatus as defined in claim 29, wherein the electron beam generating means has an electron beam gun pointed towards the seams to be welded whereby the electron beam gun is energized and swept transversely of the seams in the axis of the welding zone and is deenergized at the end of the scan and returned to its original position where it is re-energized and the sweep is repeated.

31. An apparatus as defined in claims 18, 19, 27 or 28, wherein the radiation welding source is a laser beam generator and delivery system which includes optical elements to transform the laser beam as such that it has an oblong pattern at the working plane and the oblong pattern has a major axis coincident with the welding zone which spans the plurality of seams to be welded.

32. An apparatus as defined in claim 31, wherein the laser beam delivery system has a second optical element to focus the generally oblong pattern beam and that the extent of the oblong pattern in the major axis can be adjusted and means are provided for adjusting the distance between the first and second optical elements to provide the adjustment of the length of the oblong pattern of the laser beam in the major axis.

33. An apparatus as defined in claim 31, wherein the optical elements include a first beam divider means dividing the laser beam into a plurality of beams and second optical elements to produce a generally oblong shaped beam focused at the working plane with the major axis of the oblong shape being in the longitudinal axis of the welding zone.

34. An apparatus as defined in claim 33, wherein the plurality of beams are generally parallel and means are provided for adjusting the distance between the first beam divider means and the second optical elements without affecting the shape of the focus beams.

35. An apparatus as defined in claim 33, wherein the plurality of beams are generally convergent, and means are provided for adjusting the distance between the first beam divider means and the second optical elements such that the extent of the oblong pattern of the beam in the working plane is adjusted to a desired length in the major axis of the beam.

36. An apparatus as defined in claim 33, wherein the plurality of beams are generally divergent, and means are provided for adjusting the distance between the first beam divider means and the second optical elements to adjust the extent of the longitudinal dimension of the oblong pattern of the beam in the working plane.

37. An apparatus as defined in claim 33, wherein the plurality of divided beams have circular cross-sections.

38. An apparatus as defined in claim 33, wherein the plurality of divided beams each have oblong cross-sections.

39. A method as defined in claim 6, including passing the laser beam through a second lens means to focus the generally oblong pattern, and the extent of the oblong pattern in its major axis is adjusted by adjusting the distance between the first and second lens means.

* * * * *